United States Patent [19]

Minagawa

[11] Patent Number: 4,746,192
[45] Date of Patent: May 24, 1988

[54] DIFFRACTION GRATING AND PROCESS FOR PRODUCING THE SAME

[75] Inventor: Shigekazu Minagawa, Tokyo, Japan
[73] Assignee: Hitachi, Ltd., Tokyo, Japan
[21] Appl. No.: 875,677
[22] Filed: Jun. 18, 1986
[30] Foreign Application Priority Data Jun. 28, 1985 [JP] Japan .................... 60-140383

[51] Int. Cl.⁴ .................................. G02B 5/18
[52] U.S. Cl. ....................... 350/162.2; 350/162.22; 350/162.23; 350/162.24
[58] Field of Search ........... 350/162.2, 162.22, 162.23, 350/162.24, 320

[56] References Cited

U.S. PATENT DOCUMENTS 3,585,121 6/1971 Franks ........................ 350/162.2
3,688,109 8/1972 Gamble ....................... 350/162.2
4,610,757 9/1986 Khoe et al. ................... 350/162.22

OTHER PUBLICATIONS

Tsang, Won-Tieu et al., "Profile and Groove-Depth Control in GaAs Diffraction Gratings Fabricated by Preferential Chemical Etching in $H_2SO_4$-$H_2O_2$-$H_2O$ System", *Applied Physics Letters*, vol. 28, No. 1, Jan. 1, 1976, pp. 44–46.

Primary Examiner—Bruce Y. Arnold
Attorney, Agent, or Firm—Antonelli, Terry & Wands

[57] ABSTRACT

A diffraction grating having a delineated crystallographic diffraction plane which ensuess from a procedure of alternately growing two kinds single crystal layers on a single crystal substrate into multilayers, exposing a crystallographic plane other than the plane of growth in the above-mentioned single crystal layers of the two kinds of single crystal layers in the exposed crystallographic plane; and a process for producing a diffraction grating mentioned above.

11 Claims, 3 Drawing Sheets

DIFFRACTION GRATING AND PROCESS FOR PRODUCING THE SAME

BACKGROUND OF THE INVENTION

The present invention relates to a minute, highly efficient diffraction grating, and a process for producing the same.

A diffraction grating is generally produced by engraving a large number of parallel lines on a metallic film deposited on a glass plane. This conventional process hardly provides a minute diffraction grating, and hence cannot be adapted to production of a diffraction grating to be incorporated into a miniature optical circuit such as an optical integrated circuit. It is also inadequate for producing a high resolution diffraction grating to be used for electromagnetic waves with a short wavelength, such as soft X-rays. Although there have been instances of using multilayered films of semiconductor as a reflection film (e.g. Sakai et al., Abstract for the 45th Meeting of the Japan Society of Applied Physics (Fall Meeting, 1984) p. 152, 12a - N - 4), there have heretofore been no instances of producing a minute diffraction grating from multilayered films of compound semiconductors.

SUMMARY OF THE INVENTION

An object of the present invention is to provide a small diffraction grating having a high diffraction efficiency, which has obviated the above-mentioned defects of the prior art, and a process for pioducing the same.

For the purpose of attaining the above-mentioned object, the diffraction grating according to the present invention comprises first crystal layers and second crystal layers alternately disposed so as to contact each other epitaxially on a single crystal substrate, the end faces of the first crystal layers being formed on one flat crystallographic plane other than the plane of growth and with the end faces of the second crystal layers being retracted from the end faces of the first crystal layers. The end faces of the first crystal layers correspond to the above-mentioned conventional metallic films and constitute a diffraction plane, while grooves formed by retraction of the second crystal layers correspond to the conventional engraved lines and determine the pitch of grating. The crystal layer first formed on the substrate may be either one of the first crystal layers or one of the second crystal layers.

The above-mentioned diffraction grating of the present invention can be prepared by alternately growing two kinds of single crystal layers on a single crystal substrate, exposing a crystallographic plane other than the plane of growth in the above-mentioned single crystal layers, and selectively etching one kind of single crystal layers of the two kinds of single crystal layers on the exposed crystallographic plane. The crystal plane of the unetched layer forms the diffraction plane. An improved controllability of the film thickness as a result of progress in the epitaxial growth technique including molecular beam epitaxy (MBE) and organometallic vapor phase epitaxy (OMVPE) provides a circumstance allowing formation of a periodic structure suitable for a diffraction grating, and as well, the anisotropic etching technique can expose a specific crystallographic plane. The combination of (i) the technique of forming the periodic structure utilizing the film thickness controllability of multilayered thin films prepared by the above-mentioned epitaxial growth and (ii) the anisotropic etching technique can provide, together with utilization of cleavage and etching properties of crystals, a minute diffraction grating with a high diffraction efficiency, which has a diffraction plane regulated by a specific crystallographic plane.

Additionally stated, a diffraction grating whose diffraction plane is made of a metal can be obtained by depositing the metal on the surface of a diffraction grating as obtained in the above-mentioned manner and dissolving away the above-mentioned single crystals.

DESCRIPTION OF THE PREFERRED EMBODIMENTS

EXAMPLE 1

Figure 1A:
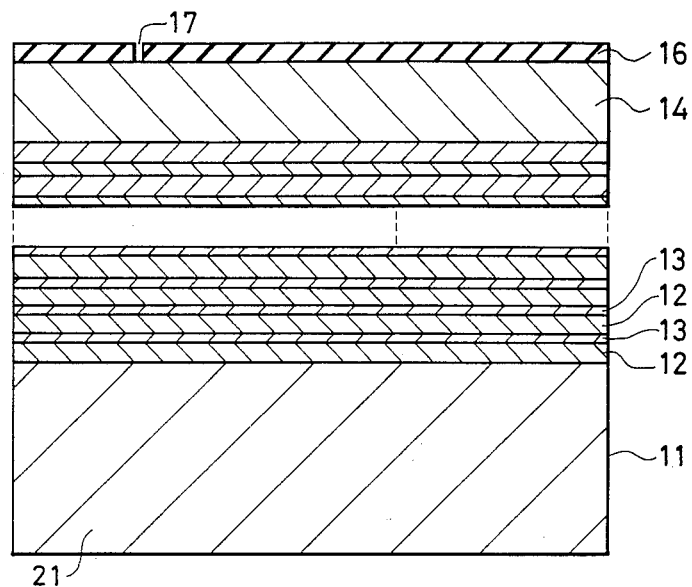
FIGS. 1a and 1b are crosssectional views showing the steps in the production of a diffraction grating according to one embodiment of the present invention.

As shown in FIG. 1a, a gallium arsenide, GaAs, layer 12 is grown in a thickness of 1,000 Å on the (100) plane of a gallium arsenide substrate 11, by the known organometallic vapor phase epitaxy (OMVPE), followed by growth of a 200 Å thick aluminium gallium arsenide ($Al_{0.35}Ga_{0.65}As$) layer 13. A combination of the gallium arsenide crystal layer 12 and the aluminum gallium arsenide crystal layer 13 is repeatedly grown about 1,000 times, then covered by a thick (300 μm) layer 14 of gallium arsenide by liquid phase epitaxy.

In the above-mentioned OMVPE, triethyl gallim, $(C_2H_5)_3Ga$, or trimethyl gallium, $(CH_3)_3Ga$, is used as the Ga source; arsine, $AsH_3$, as the As source; and triethyl aluminum, $(C_2H_5)_3Al$, or trimethyl aluminum, $(CH_3)_3Al$, as the Al source. Transport of Ga and Al is carried out by bubbling with $H_2$ gas, and arsine, 10 vol. % in hydrogen, is introduced as the arsenic source. The substrate temperature is 700° to 750° C. In this Example, composition of the aluminum gallium arsenide corresponds to $Al_{0.35}Ga_{0.65}As$. When aluminum gallium arsenide is represented by the general formula: $Al_xGa_{1-x}As$, the preferred range of x is generally $0.3 \leq x \leq 1$. For a lower value of x than 0.3, selective etching of aluminum gallium arsenide, which will be mentioned later, becomes unfavorably difficult.

Figure 1B:
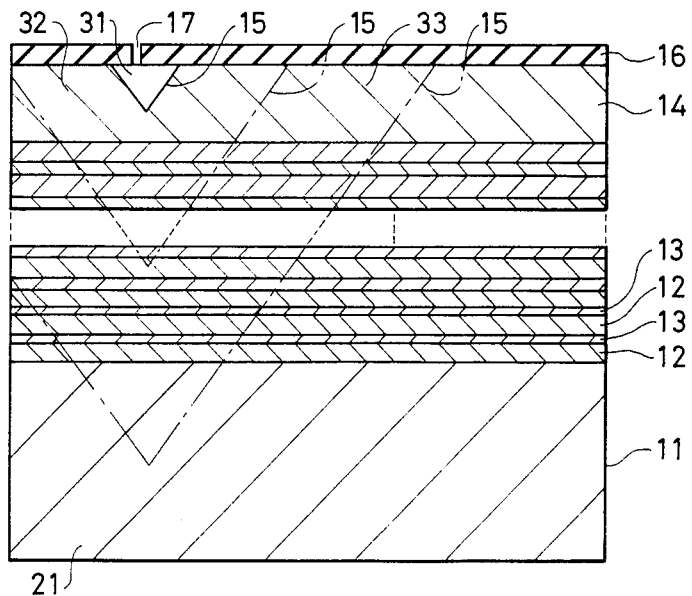

A photoresist pattern 16 with a slit 17 along the [0$\bar{1}$1] direction is formed on this multilayered wafer. Thereafter, the resulting multilayered wafer is etched with an anisotropic etching solution composed of $H_3PO_4:H_2O_2$:ethylene glycol (1:1:3) to form a groove 31 with triangular crosssection which side walls are composed of (111) planes 15 as shown in FIG. 1b. Continued etching developes a small groove 31 into a larger one 32, finally resulting in a groove 33 deep enough to reveal the multilayer on the side walls composed of (111) planes 15. In FIGS. 1a and 1b, the numeral 21 refers to a plane (0$\bar{1}$1) which implies that the plane of the paper corresponds to the plane (0$\bar{1}$1).

Next, the exposed aluminum gallium arsenide layers 13 are selectively etched to a depth of about 200 Å with an etching solution composed of HF:H$_2$O$_2$:H$_2$O (1:1:10).

Figure 2:
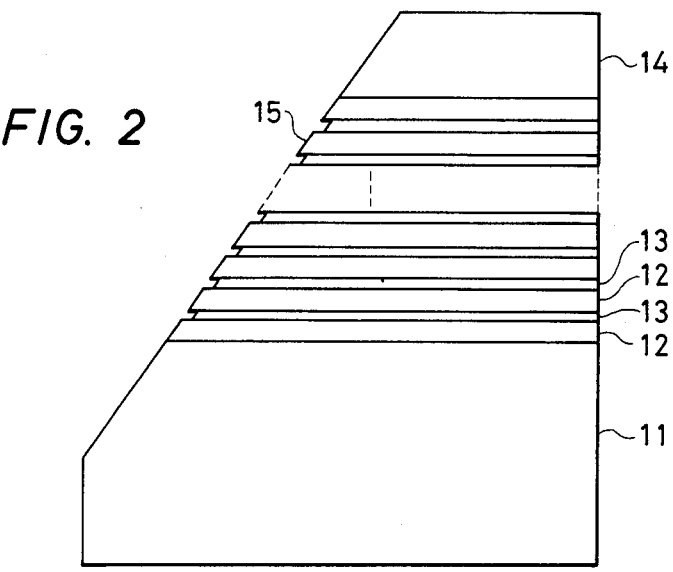
FIG. 2 is a side view of a diffraction grating according to one embodiment of the present invention.

Thus, a diffraction grating of this Example as shown in FIG. 2 is obtained. The (111) plane 15 of gallium arsenide layer 12 separated by the recessed aluminum gallium arsenide layers 13 makes the diffraction plane of the grating. It is one of 4,898 lines/mm with a pitch of grating of 2,024 Å. The wafer produced in the above-mentioned manner is cleaved into squares of 2 mm to obtain minute diffraction gratings.

Additionally stated, the diffraction efficiency of this grating depends on the relative thickness of the two kinds of the crystals which composes the multilayers. With an increase in the relative thickness of the crystal layers to be selectively etched, the diffraction efficiency of a grating made thereof generally decreases due to the relative reduction in the area of the diffraction plane.

EXAMPLE 2

Figure 5:
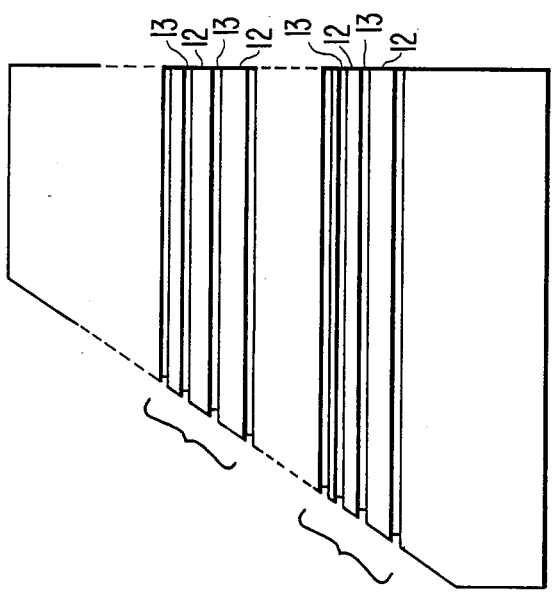
FIG. 5 shows a side view of a diffraction grating having plural chirped gratings.
Figure 4:
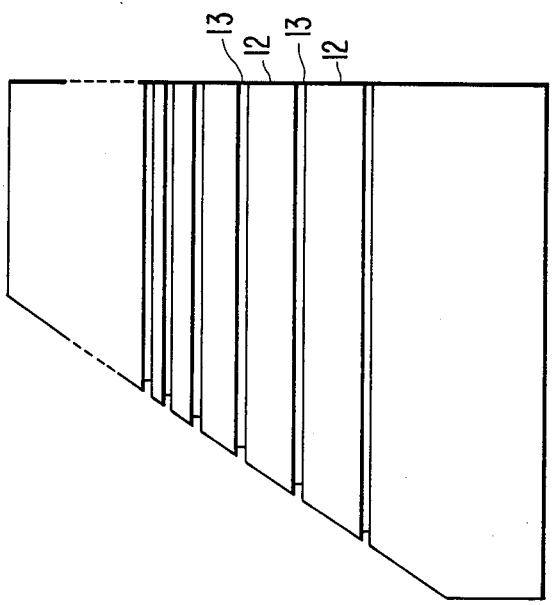
FIG. 4 shows a side view of a chirped diffraction grating.

When the thickness of neighboring gallium arsenide crystal layers 12 of Example 1 are increased or decreased by 50 Å, a so-called chirped diffraction grating can be formed. When a set of a chirped gratings as mentioned above is repeatedly formed, a chirped diffraction grating well adapted to a wider ray can be provided. It can be used to extract soft X-ray micro beams with different wavelengths from a continuous X-ray source. Such chirped diffraction gratings are shown in FIGS. 4 and 5 wherein like reference numerals are used to designate like portions as shown in FIG. 2.

EXAMPLE 3

Figure 3:
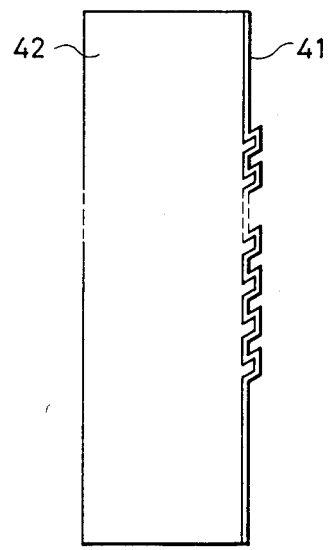
FIG. 3 is a side view of a diffraction grating according to another embodiment of the present invention.

Gold plating is effected on a diffraction grating as obtained in Example 1 or 2, followed by electroless plating to deposit a thick nickel layer thereon. After the above-mentioned nickel layer is covered with wax, the crystal layers are dissolved away with an etching solution to form a diffraction grating made of gold 41 as shown in FIG. 3. The above-mentioned diffraction grating is mounted on a silicon substrate or the like in the use thereof. In FIG. 3, the numeral 42 refers to the nickel plating layer. The diffraction grating thus produced has a diffraction efficiency of 75% at 5,500 Å. In this case, the portions corresponding to the diffraction plane are the end faces of the aluminum gallium arsenide layers 12. Accordingly, it is preferable to increase the relative thickness of the aluminum gallium arsenide layers against gallium arsenide.

When a metal capable of being easily dissolved away with an etching solution is plated instead of the above-mentioned gold and nickel plating and a replica is then formed again, a metallic diffraction grating having substantially the same size of diffraction plane as in the one shown in FIG. 2 is obtained.

EXAMPLE 4

In Example 1, the wafer having multilayered films laminated thereon is etched with an anisotropic etching solution to expose the plane (111) 15. Instead of such anisotropic etching, cleavage is effected along the plane (011) perpendicularly intersecting the plane of growth (100) in the above-mentioned wafer, and selective etching is then applied to obtain a diffraction grating with the cleaved plane serving as the diffraction plane.

Although a selective etch solution is employed in the foregoing Examples, a dry-etch technique capable of selective etching can be utilized as well.

As described above, in the diffraction grating and the process for producing the same according to the present invention, two kinds of single crystal layers are alternately grown on a single crystal substrate into multilayers, a crystallographic plane other than the plane of growth in the above-mentioned single crystal layers is exposed, and any one of two kinds of single crystals is selectively etched in the exposed crystallographic plane to form a diffraction grating on the plane revealed by selective etching. Thus, utilization of multilayered film growth by the epitaxial growth technique, cleavage or anisotropic etching properties peculiar to crystals, and the like enables a minute diffracition grating determined crystallographically to be produced. This makes it possible to produce a minute diffraction grating well adapted to a case where a micro beam is involved in, for example, an optical integrated circuit, or a diffraction grating suitable to be used in the spectroscopy of electromagnetic waves with very short wavelengths (e.g., soft X-rays). Since an atomically smooth crystallographic plane is created by anisotropic etching or cleavage, a diffraction grating having a high reflectivity and hence a high diffraction efficiency can be obtained.

Incidentally, in the diffraction grating and the method of producing the same of the present invention, conventional knowledge and known teachings may be adopted in connection with matters not specifically described in the instant specification.

What is claimed is:

1. A diffraction grating comprising first crystal layers and second crystal layers alternately disposed epitaxially on a single crystal substrate, the end faces of the first crystal layers being formed on one flat crystallographic plane other than the plane of growth while the end faces of the second crystal layers being retracted from the end faces of the first crystal layers.

2. A diffraction grating as claimed in claim 1, wherein said first crystal layers are made of gallium arsenide, and said second crystal layers are made of aluminum gallium arsenide or aluminum arsenide.

3. A diffraction grating as claimed in claim 2, wherein said second crystal layers are made of aluminum gallium arsenide or aluminum arsenide represented by a general formula: Al$_x$Ga$_{1-x}$As (provided that $0.3 \leq x \leq 1$).

4. A diffraction grating as claimed in claim 1, wherein said first crystal layers are so formed as to gradually increase or decrease the thickness, thereof, whereby a chirped diffraction grating is formed.

5. A diffraction grating as claimed in claim 4, wherein plural said chirped gratings are incorporated.

6. A process for producing a diffraction grating comprising the steps of: (i) alternately growing epitaxially first crystal layers and second crystal layers on a single crystal substrate into multilayers; (ii) exposing a flat crystallographic plane other than the plane of growth in said first and second crystal layers; and (iii) selectively etching said second crystal layers on the exposed crystallographic plane.

7. A process for producing a diffraction grating as claimed in claim 6, wherein said first crystal layers are made of gallium arsenide, and said second crystal layers are made of aluminum gallium arsenide or aluminum arsenide.

8. A process for producing a diffraction grating as claimed in claim 7, wherein said second crystal layers are made of aluminum gallium arsenide or aluminum arsenide represented by a general formula: $Al_xGa_{1-x}As$ (provided that $0.3 \leq x \leq 1$).

9. A process for producing a diffraction grating as claimed in claim 6, wherein anisotropic etching is effected in said step (ii).

10. A process for producing a diffraction grating as claimed in claim 6, wherein a selective etching solution is used in said step (iii).

11. A process for producing a diffraction grating comprising the steps of: (i) alternately growing epitaxially first crystal layers and second crystal layers on a single crystal substrate into multilayers; (ii) exposing a flat crystallographic plane other than the plane of growth in said first and second crystal layers; (iii) selectively etching said second crystal layers on the exposed crystallographic plane; (iv) depositing a thick metal film on the end faces including the exposed crystallographic plane and the etched plane; and (v) dissolving away the crystals on which said metal is deposited.

* * * * *